United States Patent
Bobrek et al.

(10) Patent No.: US 11,703,601 B2
(45) Date of Patent: Jul. 18, 2023

(54) SIGNAL PROCESSING APPARATUS AND METHODS

(71) Applicant: FAIRWINDS TECHNOLOGIES, LLC, Annapolis, MD (US)

(72) Inventors: Pavlo Bobrek, Bradenton, FL (US); Timothy Hillner, Middletown, DE (US); Glenn Link, Odenton, MD (US)

(73) Assignee: CANNON ERGOS S.P.A.

( * ) Notice: Subject to any disclaimer, the term of this patent is extended or adjusted under 35 U.S.C. 154(b) by 0 days.

(21) Appl. No.: 17/577,308

(22) Filed: Jan. 17, 2022

(65) Prior Publication Data

US 2022/0308239 A1  Sep. 29, 2022

Related U.S. Application Data

(60) Provisional application No. 63/162,051, filed on Mar. 17, 2021.

(51) Int. Cl.
*G01S 19/45* (2010.01)
*G01S 19/44* (2010.01)
*G01S 19/42* (2010.01)

(52) U.S. Cl.
CPC ........... *G01S 19/44* (2013.01); *G01S 19/423* (2013.01); *G01S 19/45* (2013.01)

(58) Field of Classification Search
CPC ......... G01S 19/44; G01S 19/423; G01S 19/45
See application file for complete search history.

(56) References Cited

U.S. PATENT DOCUMENTS

| | | |
|---|---|---|
| 9,240,843 B1 | 1/2016 | Malouin et al. |
| 9,954,602 B2 | 4/2018 | Hoffmeyer et al. |
| 10,256,858 B1 | 4/2019 | Hakkola |
| 2008/0298495 A1 | 12/2008 | Salvi et al. |
| 2010/0086086 A1 | 4/2010 | Rawlins et al. |
| 2011/0142151 A1 | 6/2011 | Zhang et al. |
| 2012/0321012 A1 | 12/2012 | Elenes et al. |

*Primary Examiner* — Mathew Franklin Gordon
(74) *Attorney, Agent, or Firm* — Laubscher & Laubscher PC

(57) ABSTRACT

A signal processing apparatus and method provides the ability to dynamically select a subset of subcarriers from a received frequency division multiplex (FDM), select which subsets of subcarriers are coherently combined per satellite, and translate the selected subcarriers into a FDM having a smaller bandwidth. There are at least two first phase aligners, a digital cross-connect, and at least two second phase aligners. The first and second phase aligners are configured to receive a pair of in-phase and quadrature pairs and provide automatic gain control and coherent combing of the pairs. The digital cross-connect is configured to receive the in-phase and quadrature pairs from the two phase aligners and associate any in-phase and quadrature pair with another. Preferably, the apparatus further includes dual front-end digital channelizers configured to convert signals into an in-phase and quadrature pairs which are input to the first phase aligners.

16 Claims, 8 Drawing Sheets

SIGNAL PROCESSING APPARATUS AND METHODS

This application claims the benefit of provisional patent application No. 63/162,051 filed on Mar. 17, 2021, the entire contents of which are incorporated herein by reference.

This invention was made with government support under contract number W56KGU-20-C-0022 awarded by the U.S. Army. The government has certain rights in the invention.

BACKGROUND OF THE DISCLOSURE

The present disclosure relates generally to a signal processing apparatus, and more specifically to an apparatus which includes a dynamic digital phase aligner.

Reception of signals from satellites can be performed using a phased array antenna consisting of multiple antenna elements. Due to the plethora of satellites and their changing coordinates with respect to a ground-based receiver, beam steering must be performed to focus the array on a particular satellite while nulling out interfering sources. Beam steering is achieved by constraining the relative time delay and phase of the signals received from antenna elements within a phased array antenna before they are summed together in a process known as "coherent combining".

When antenna size is constrained by deployment considerations, reception of signals from satellites can also be performed using multiple dish antennas, which are mechanically focused onto a particular satellite. Due to the size constraints, or redundancy requirements, the signals from multiple dish antennas, or antenna elements within a phased array antenna, must be coherently combined to achieve a desired signal-to-noise ratio for the receiving modem. Though the dish antennas are focused on the satellite of interest, differences in effective cable length must be considered to perform coherent combining. And even when the cable lengths are known and fixed, environmental factors, such as temperature and vibration, can impact the phase of the modulated signals to be combined. These issues require strategies for adapting to varying effective cable lengths.

The adaptability of a set of antennas or antenna elements to alternative deployment scenarios may require the reception of signals from multiple satellites. This in turn requires a flexible means to select and dynamically adapt which dish antennas or antenna elements within a phased array are to be coherently combined for optimal reception of a given set of satellites.

Previous means to achieve coherent combining fall broadly into 3 classes: Analog combining, digital combining, and hybrid combining. Hybrid combining uses analog combining as a front end with digital combining as the back end.

Pure analog coherent combining suffers from a reduction in the achievable tracking angle, relative to the vector normal to the phased array (i.e. "squint angle"), as the size of the phased array or the symbol rate of the received subcarrier is increased. This is due to the limited tuning range of analog delays.

Purely digital coherent combining suffers from prohibitive power requirements when applied to large phased-array antennas. Digital combiners do not necessarily offer a means to automatically adapt the phase among subarrays and, thus are not suitable for distributed dish antennas, which require rapid phase adaptation.

Hybrid coherent combiners offer the ability to use analog coherent combining for small subarrays whose size achieves the desired squint angle, and introduces the ability to digitally adjust the delay between subarrays to achieve a larger squint angle. Hybrid combiners do not necessarily offer a means to automatically adapt the phase among subarrays and, thus are not suitable for distributed dish antennas, which require real-time phase adaptation, e.g., due to temperature variations.

As noted above, existing apparatuses and methods for signal processing, including coherent combining, have drawbacks. Thus, a new apparatus and new methods are needed to improve upon the drawbacks of those known in the art.

SUMMARY OF THE DISCLOSURE

Accordingly, it is an object of the present disclosure to provide a signal processing apparatus and method that provides the ability to dynamically select a subset of subcarriers from a received frequency division multiplex (FDM), select which subsets of subcarriers are coherently combined per satellite, and translate the selected subcarriers into a FDM having a smaller bandwidth than the originally received FDM.

The apparatus includes at least two first phase aligners, a digital cross-connect, and at least two second phase aligners. The first and second phase aligners are configured to receive a pair of in-phase and quadrature pairs and provide automatic gain control and coherent combing of the pairs. The digital cross-connect is configured to receive the in-phase and quadrature pairs from the two phase aligners and associate any in-phase and quadrature pair with another. When a signal is processed through the first phase aligners, the digital cross-connect, and the second phase aligners, reduced bandwidth in-phase and quadrature pairs are output providing a data transfer with a low probability of undetected error. Preferably, the apparatus further includes dual front-end digital channelizers configured to receive an output of a radio frequency mixer and convert the output into an in-phase and quadrature pair which are received by the first phase aligners. The radio frequency mixers are configured to down-convert radio frequency signals of at least four antenna sources to be received by the digital channelizers.

One embodiment of the phase aligners includes a pair of automatic gain controls each including an enabling component, a threshold detector and a dropout detector. Each automatic gain control is configured to receive an in-phase and quadrature pair from a channelizer and output a gain-adjusted pair. The phase aligners further include a phase detector, a low pass filter, and a rotator, which are configured to phase align in-phase and quadrature pairs. Adders are also included and configured to coherently combine the phase aligned in-phase and quadrature pairs. Lastly, the phase aligners of this embodiment include a multiplexer which is configured to output one of the coherently combined pairs and a gain-adjusted delayed pair.

One embodiment of the digital channelizers includes an analog to digital converter, a numerically controlled oscillator and multipliers, a pair of lowpass filters, a pair of delay adjusters, and a pair of interpolators. The oscillator and multipliers are configured to frequency translate signals from the analog to digital converter which the lowpass filters output as in-phase and quadrature components. The delay adjusters are configured to receive one of the in-phase and quadrature components from the lowpass filters and provide time-of-arrival adjustment to the components. The interpolators are configured to adjust a time mismatch that results from the analog to digital converter.

In an embodiment of the apparatus, there further includes at least one digital upconverter and one digital to analog converter. The upconverter is configured to translate the reduced bandwidth output pairs to an alternate frequency having a more compact bandwidth. This is then converted to an analog signal.

In a second embodiment, the phase aligners are configured to selectively provide or bypass either of the automatic gain control or coherent combining.

In yet another embodiment, the phase aligners further include a mean squared error module configured to measure the mean squared error between phase aligner outputs.

It is also an object of the present disclosure to provide at least one non-transitory computer readable storage media having executable instructions stored thereon for adaptively phase aligning and combining a frequency multiplexed subcarrier. The executable instructions perform the steps of, receiving and down-converting at least one frequency division multiplexed radio frequency signal, selecting a subcarrier of the signal and converting the subcarrier into in-phase and quadrature pairs, phase aligning in-phase and quadrature pairs including providing automatic gain control to each pair and selectively coherently combing the pairs, selectively associating phase aligned in-phase and quadrature pairs, and phase aligning the associated pairs. Providing automatic gain control and coherently combining the associated pairs may be bypassed.

In one embodiment the executable instructions further performs the steps of, translating processed subcarriers to a different frequency to provide a frequency division multiplexed signal having a more compact bandwidth than the originally received signal, and converting the translated signal to an analog signal.

In another embodiment, converting the subcarrier includes the steps of, converting the subcarrier to a digital signal, frequency translating the signal, forming in-phase and quadrature components, providing time-of-arrival adjustment, and adjusting for sample time mismatch that results from converting the analog signal to a digital signal.

In yet another embodiment, the phase aligning steps include the steps of, providing automatic gain control of two in-phase and quadrature pairs, phase aligning the two pairs, coherently combining the phase aligned pairs, and outputting the coherently combined pairs and a gain-adjusted pair. Alternatively, two gain-adjusted pairs that have not been coherently combined are output.

In a further embodiment, the phase aligning steps further include the step of measuring mean squared error between outputs to improve phase alignment of in-phase and quadrature pairs.

BRIEF DESCRIPTION OF THE FIGURES

Other objects and advantages of the disclosure will become apparent from a study of the following specification when viewed in the light of the accompanying drawing, in which.

DETAILED DESCRIPTION

Figure 1:
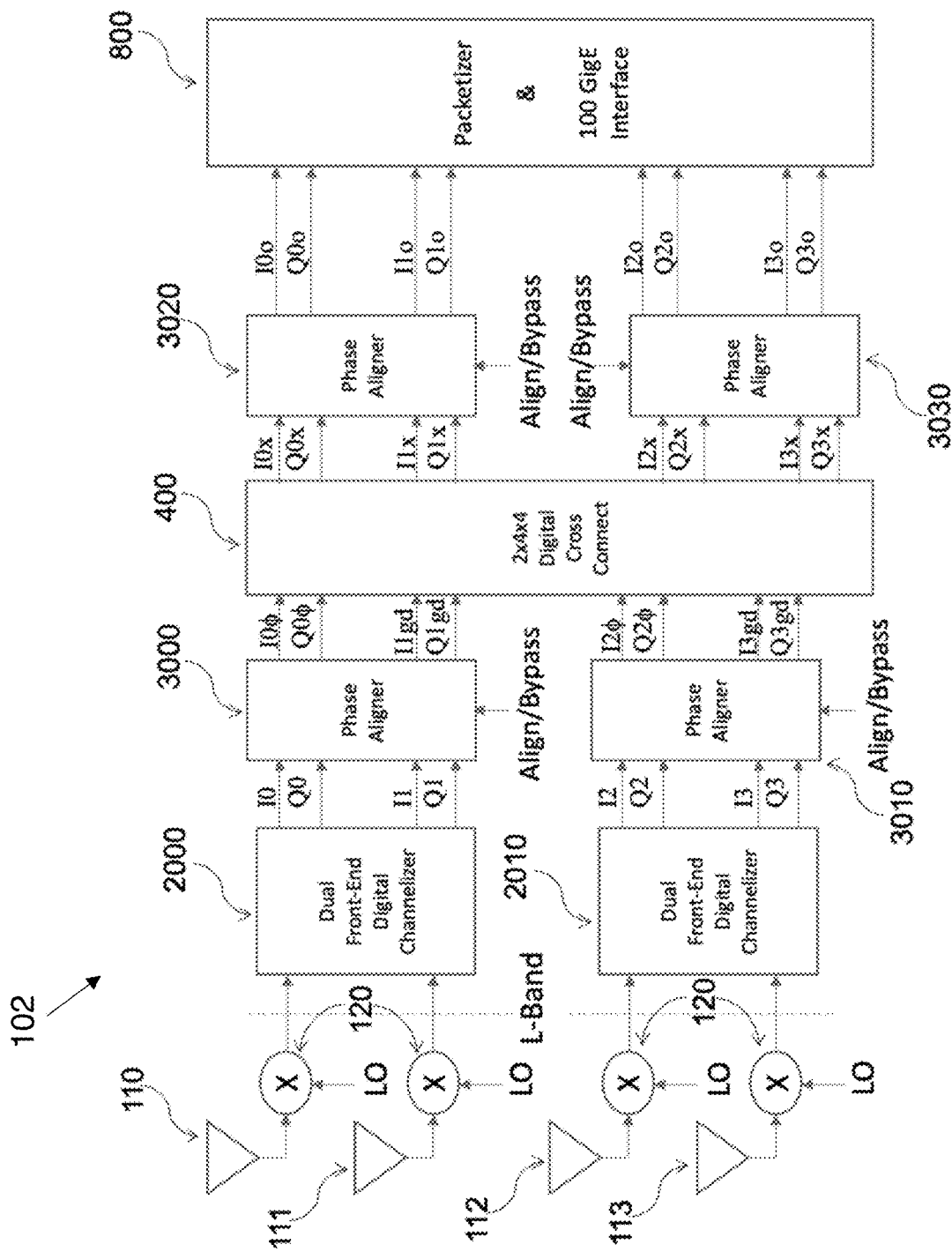
FIG. 1 is a schematic of one embodiment of a digital phase aligner according to the present disclosure.

The present disclosure includes an apparatus and methods that are designed to be used as a digital or hybrid combiner. They offer the ability to select which subcarriers from a multitude of subarrays in a phased array or multiple dish antennas are to be processed. Processing includes the ability to delay, phase align, and combine any of the subcarriers from any antennas or antenna elements and to frequency translate the processed subcarriers into a bandwidth that is narrower than the original FDM from which they were selected. This serves to reduce the bandwidth that must be serviced by downstream modems or are digitally communicated, for example via VITA 49.2.

This disclosure also includes multiple analog-to-digital converters (ADCs) that digitize an analog FDM signal. Each ADC is coupled to a different antenna (e.g. dish) or, as a hybrid combiner, the output of an analog coherent combiner attached to a small cluster of proximate antenna elements (i.e. a subarray) of a phased array antenna.

Another aspect of this disclosure includes digital down converters (DDC) associated with each ADC that translate the frequency of a subcarrier within the digitized FDM to baseband or a frequency suitable for additional digital signal processing (DSP). Also included are a decimation filter following the DDC that can filter the selected subcarrier or subcarriers and exclude undesired subcarriers, a digital programmable delay having a resolution that is one sample at the decimated sample frequency, and a sample phase aligner that, through interpolation, can translate the sampling phase of the decimated ADC samples.

Another aspect includes combining subcarriers received from multiple antennas at the output of their sampling phase aligners. An adaptive phase aligner provides automatic gain control to normalize the signal amplitude of a pair of incoming subcarriers signals to be coherently combined, including adaptively rotating the in-phase (I) and quadrature (Q) vectors of one of the subcarrier signals in real time to match the I and Q vectors of the other subcarrier, without demodulation, and coherently combine the resultant phase aligned signals.

Aspects of this disclosure further provide the ability to output the processed subcarriers through a digital-to-analog converter (DAC) and to packetize the processed subcarriers into a VITA 49.2 stream transmitted to a remote location.

The exemplary embodiments are described below with reference to the drawings. These drawings illustrate certain details of specific embodiments that implement the module, method, and computer program product described herein. However, the drawing should not be construed as imposing any limitations that may be present in the drawings. The methods and computer program product may be provided on any machine-readable media for accomplishing their operations. The embodiments may be implemented using an existing computer processor, or by a special purpose computer processor incorporated for this or another purpose, or by a hardwired system such as a field programmable gate array (FPGA), or by an application specific integrated circuit (ASIC).

Embodiments may be practiced in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the internet and may use a wide variety of different communication protocols. Those skilled in the art will appreciate that such network computing environments will typically encompass many types of computer system configuration, including personal computers, hand-held devices, multiprocessor systems, microprocessor-based or programmable consumer electronics, network PCs, mini-computers, mainframe computers, and similar devices.

Embodiments may also be practiced in distributed computing environments where tasks are performed by local and remote processing devices that are linked by hardwired links, wireless links, or by a combination of hardwired or wireless links through a communication network. In a distributed computing environment, program modules may be located in both local and remote memory storage devices.

A system for implementing the disclosed embodiments might include a general-purpose computing device in the form of a computer, including a processing unit, a system memory, and a system bus, that couples various system components including the system memory to the processing unit. The system memory may include those known in the art, for instance read only memory (ROM) and random-access memory (RAM). Other elements may include a magnetic disk drive, an optical disk drive, or a flash memory drive, to name a few. The drives and their associated machine-readable media provide nonvolatile storage of machine-executable instructions, data structures, program modules and other data for the computer.

The embodiments of the present disclosure relate to transferring data messages with a low probability of undetected error from, 1) an array of antennas, 2) antenna elements in a phased array antenna structure, or 3) phase aligned subarrays of a phased array antenna structure (collectively "antenna sources"), to one or more modems that demodulate signals received from these antenna sources.

FIG. 1 is a schematic representation of one embodiment of a digital phase aligner 102 where the processed output is destined for a VITA 49.2 packetizer that transfers packets over a 100 gigabit Ethernet link. Four antenna inputs are shown here, but it will be understood by those with skill in the art that the architecture could be extended to a larger number of antennas, front end digital channelizers, phase aligners and digital cross-connects.

Radio frequency (rf) signals are received from antenna sources 110, 111, 112, 113 in the form of a frequency division multiplex (FDM) consisting of multiple subcarriers signals received from one or more satellite source. The FDM is down-converted by radio frequency mixers 120 to an intermediate frequency band, for example to L-band with a frequency range of 900 MHz to 2000 MHz. The output of the mixers 120 is input to dual front end digital channelizers 2000, 2010. Each dual front end channelizer includes one channelizer for one antenna source. Each channelizer may select the same subcarrier out of the FDM from separate source antennas or may select a different subcarrier from each antenna depending on a user-selected configuration.

The subcarriers selected from each antenna 110, 111, 112, 113 are converted by each of the channelizers 2000, 2010 into separate in-phase (I) and quadrature (Q) pairs I0/Q0, I1/Q1, I2/Q2, and I2/Q3, each associated herein with respective antenna reference numerals. Preferably, the I/Q pairs are baseband or at another intermediate frequency between baseband and L-band.

Channelizers 2000, 2010 use digital signal processing to select one or more subcarriers from the FDM. The I/Q pairs are output to digital phase aligners 3000, 3010, each of which provide an automatic gain control (AGC) for each channel and the option to coherently combine a subcarrier received from two different antenna sources. Coherent combining of subcarriers improves signal-to-noise ratio, and phase aligning, as detailed further below, provides dynamic tracking of the phase mismatch of a subcarrier received from different antenna sources. The two I/Q pairs from channelizer 2000 are output to phase aligner 3000, and the two I/Q pairs from channelizer 2010 are output to phase aligner 3010.

Phase aligners 3000, 3010 output coherently combined I/Q pairs I0ϕ/Q0ϕ, I2ϕ/Q2ϕ, respectively, and delayed, amplified I/Q pairs I1gd/Q1gd, I3gd/Q3gd, respectively, the latter of which coherent combining was bypassed. It will be understood by those with skill in the art that coherent combining may be applied or bypassed for any I/Q pair.

The phase aligner outputs I0ϕ/Q0ϕ, I1gd/Q1gd, I2ϕ/Q2ϕ, I3gd/Q3gd are input to a 2×4×4 digital cross-connect 400 which is configured to independently select any of the input pairs for outputs I0x/Q0x, I1x/Q1x, I2x/Q2x, and I3x/Q3x.

The 2×4×4 digital cross-connect 400 provides the means for any of its four I/Q outputs to select any of its four I/Q inputs. In one configuration, I0x/Q0x could select outputs I0ϕ/Q0ϕ and I1x/Q1x could select phase aligned outputs of I2ϕ/Q2ϕ. This provides the option of adaptively phase aligning and combining a FDM subcarrier received from either 3 or 4 antenna sources.

Following the cross-connect 400, a second pair of phase aligners 3020, 3030 is provided. These phase aligners are similar to the first phase aligners 3000, 3010 but they might have their AGC disabled. They have the option to coherently combine the signal received from their two input sources or bypass coherent combining.

The combination of the first phase aligners 3000, 3010, the 2×4×4 cross-connect, and the second phase aligners 3020, and 3030 provides for coherent combining of any pair of the antenna sources 110, 111, 112, 113, any two pairs of the antenna sources, any three of the antenna sources, or all four antenna sources.

The outputs of the adaptive phase aligners 3020, 3030 are inputs to a packetizer 800 which has a 100 gigabit per second Ethernet (100 GigE) interface. The packetizer 800 preferably conforms to certain standards such as VITA 49 and IEEE 802.3, but may be an ad hoc packetizer that conforms to no particular standard and uses a different interface other than 100 GigE.

Figure 2:
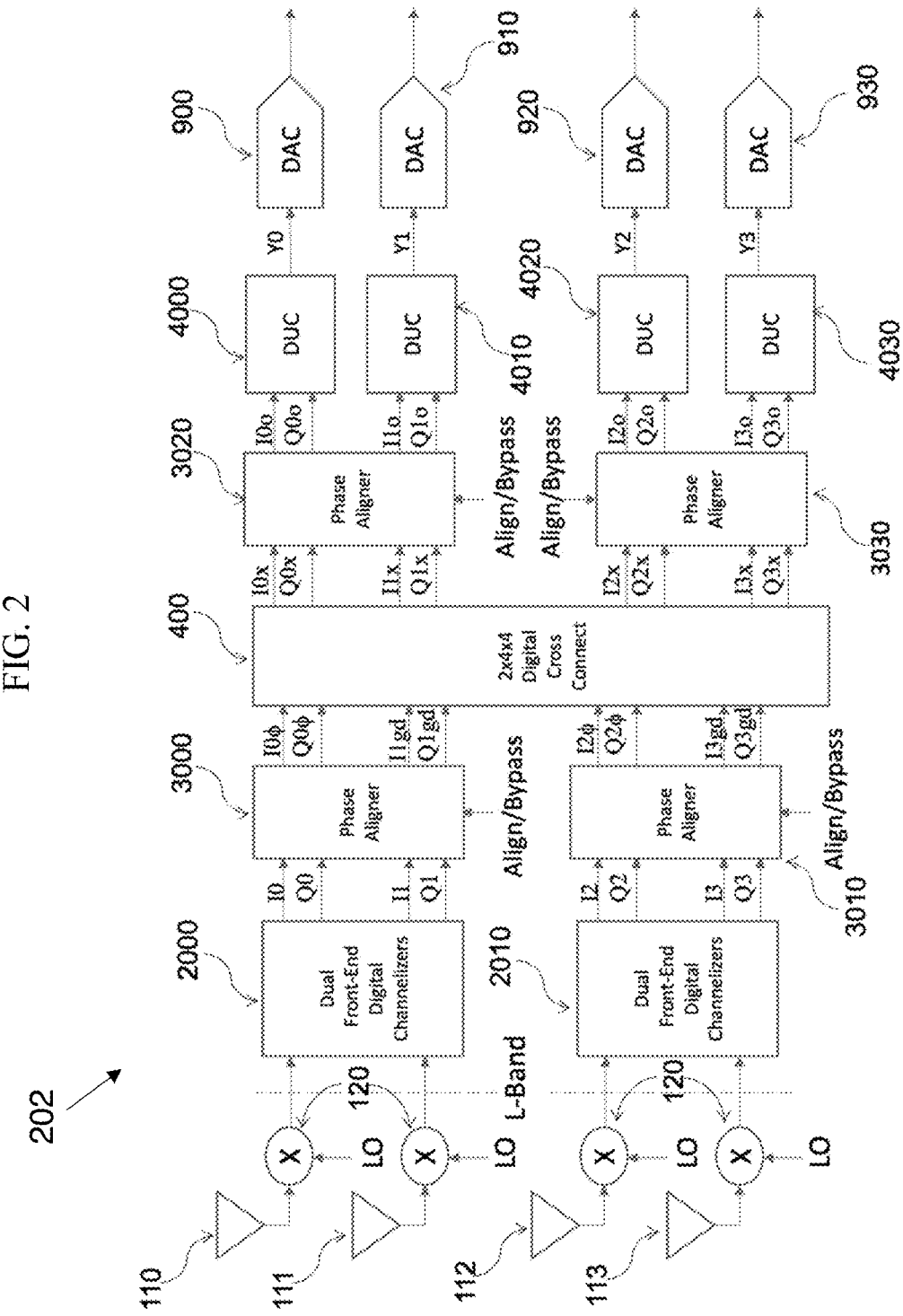
FIG. 2 is a schematic of a second embodiment of a digital phase aligner according to the present disclosure.

Referring now to FIG. 2, a schematic of a second embodiment of a digital phase aligner is shown. As with the phase aligner of FIG. 1, the digital phase aligner 202 includes antenna sources 110, 111, 112, 113, radio frequency mixers 120, a pair of dual front end digital channelizers 2000, 2010 which convert subcarriers into I/Q pairs, a pair of phase aligners 3000, 3010, a 2×4×4 digital cross connect, and a second pair of phase aligners. Each of these elements are configured as described above with the embodiment of FIG. 1. That is, to receive radio frequency (rf) signals from the antenna sources in the form of a frequency division multiplex (FDM) consisting of multiple subcarriers, use digital signal processing to select one or more subcarriers from the FDM, dynamically select which antenna sources are to be combined, and adaptively phase align and coherently combine selected subcarriers received from different antenna sources. As with the embodiment shown in FIG. 1, it will be understood by those with skill in the art that the number of channelizers and phase aligners included with the embodiment shown in FIG. 2 can be increased as antenna sources increase.

In addition to those elements described above, the embodiment of FIG. 2 also includes digital upconverters (DUCs) 4000, 4010, 4020, 4030 and digital-to-analog converters (DACs) 900, 910, 920, 930. The DUCs translate incoming subcarriers to a different frequency and thereby reconstruct a FDM with a more compact bandwidth. The DACs provide an analog rf output of the processed subcarriers' signals for external analog combination and/or direct input to external modems.

Figure 3:
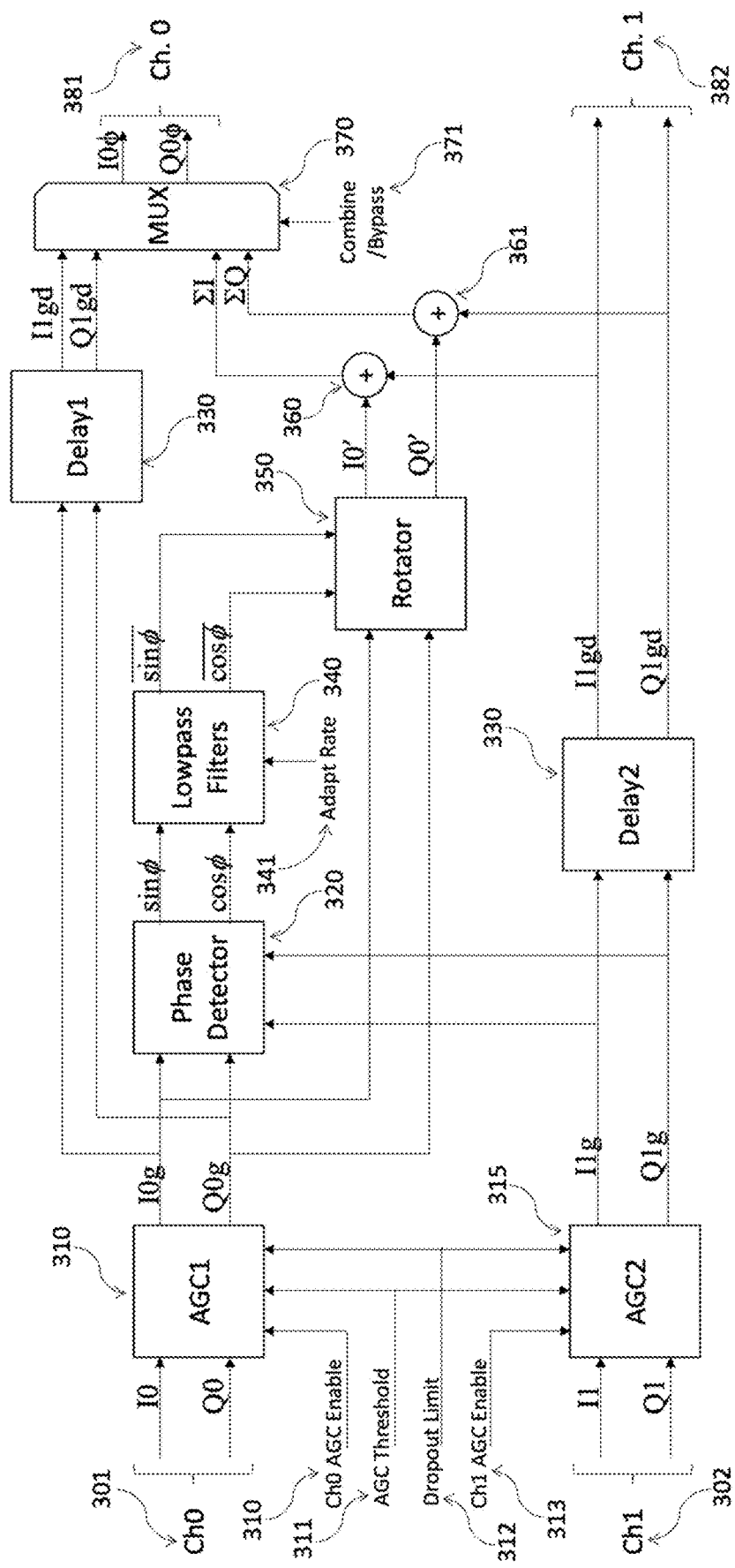
FIG. 3 is a schematic of one embodiment of an adaptive phase aligner according to the present disclosure.

FIG. 3 shows a preferred embodiment of the phase aligners 3000, 3010, 3020, 3030. Two channelized signal sources 301, 302 are input to an adaptive phase aligner as I/Q pairs. A first automatic gain control (AGC1) 310 receives the Ch0 pair, and a second automatic gain control (AGC2) 315 receives the Ch1 pair. If respective AGC Enable 310, 313 are active, they provide automatic gain control to their respective I0/Q0, I1/Q1 pairs. If they are not active, then the respective I/Q pairs are delayed replicas of the input pairs.

Each of AGC1 310 and AGC2 315 have additional controlling inputs, an AGC threshold 311 and a dropout limit 312. The AGC threshold is the peak amplitude that causes an incremental decrease in gain, and the dropout limit controls the number of sample clocks that a signal may be below a fraction (e.g. ¼) of the AGC threshold before gain is incrementally increased.

A phase detector 320 facilitates adaptative phase alignment by providing an estimate of the phase displacement angle $\phi$ between complex vector I0g+jQ0g and complex vector I1g+jQ1g, where j is the square root of −1. Phase detector outputs are the sin $\phi$ and cos $\phi$ of the displacement angle $\phi$. Lowpass filters 340 include an adapt rate parameter 341 that controls the phase adaptation rate. This parameter is adjusted commensurate with the symbol rate of the subcarrier from Ch0 301 and Ch1 302 that are to be phase aligned. The lowpass filters 340 provide an average of sin $\phi$ and cos $\phi$ to a rotator 350 that phase aligns I0g/Q0g with I1gd/Q1gd, the latter of which are I1g/Q1g passed through a delay 330 to compensate for the computational delay of the phase detector, lowpass filter, and rotator.

The rotator output pairs I0'/Q0' are the phase adjusted values of I0g and Q0g. The adders 360, 361 output the sum of in-phase and quadrature components (i.e. $\Sigma I = I0' + I1gd$ and $\Sigma Q = Q0' + Q1gd$). $\Sigma I$ and $\Sigma Q$ are the coherently combined output of the adaptive phase aligner. Lastly, the MUX 370 selects whether or not adaptive phase alignment is output 381. If the MUX 370 is configured to bypass adaptive phase alignment, the delayed and gain adjusted samples I1gd/Q1gd of Channel 0 are output 381. The delay and gain adjusted samples of Channel 1 are output 382.

Referring again to FIGS. 1 and 2, the phase aligners 3000, 3010 receive the output of the dual channelizers 2000, 2010, respectively, and provide an optional automatic gain control (AGC) for each I and Q pair received. If the subcarrier selected from the FDM by a dual channelizer is the same subcarrier received from two different antenna sources, for example from antennas 110 and 111, then adaptive phase aligning and coherent combining may be enabled for the phase aligner. If adaptive phase aligning and coherent combining are enabled, the output pair, for instance I0$\phi$/Q0$\phi$, is the coherently-combined subcarrier from antennas 110 and 111. Similarly, if a dual channelizer selects the same subcarrier from the FDM for antennas 112 and 113, and adaptive phase aligning and coherent combining are enabled, the output pair I2$\phi$/Q2$\phi$ is the coherently-combined subcarrier from antennas 112 and 113.

Figure 4:
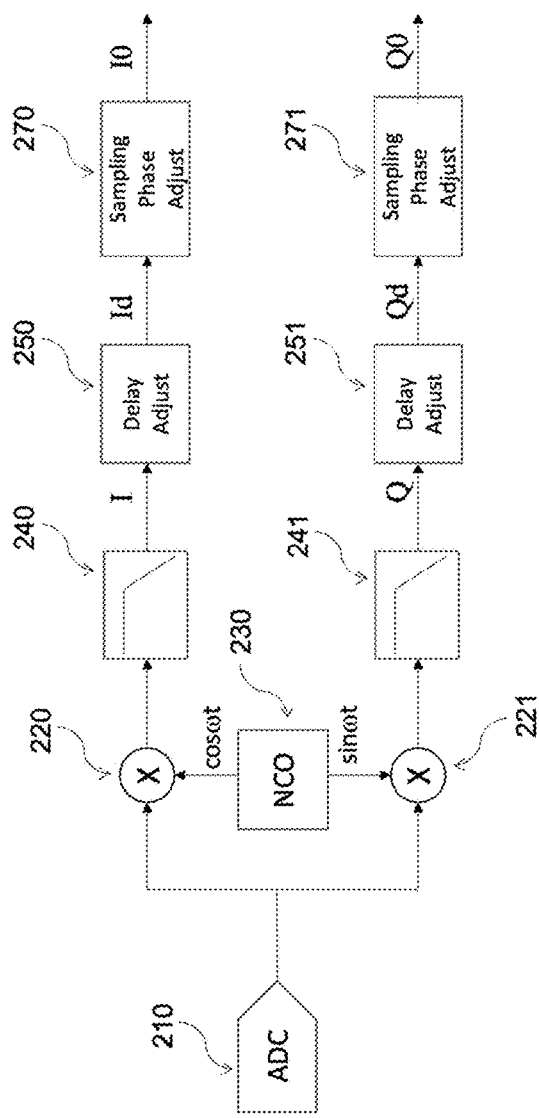
FIG. 4 is a schematic of one embodiment of a front end digital channelizer according to the present disclosure.

Referring now to FIG. 4, one embodiment of one channel of one of the dual front end digital channelizers 2000, 2010 is shown. An analog-to-digital converter (ADC) 210 digitizes a signal, for example an L-band FDM signal. A numerically controlled oscillator (NCO) 230 together with multipliers 220, 221 performs a complex frequency translation which results in a pair of low frequency images, each of which are selected by lowpass filters 240, 241 resulting in in-phase (I) and quadrature (Q) components. A delay adjust 250, 251 provides time-of-arrival adjustment among antenna sources to within a fraction of a symbol. The sampling phase adjust includes an interpolator that adjusts for ADC sample time mismatch to within a small fraction of a sampling period.

Figure 5:
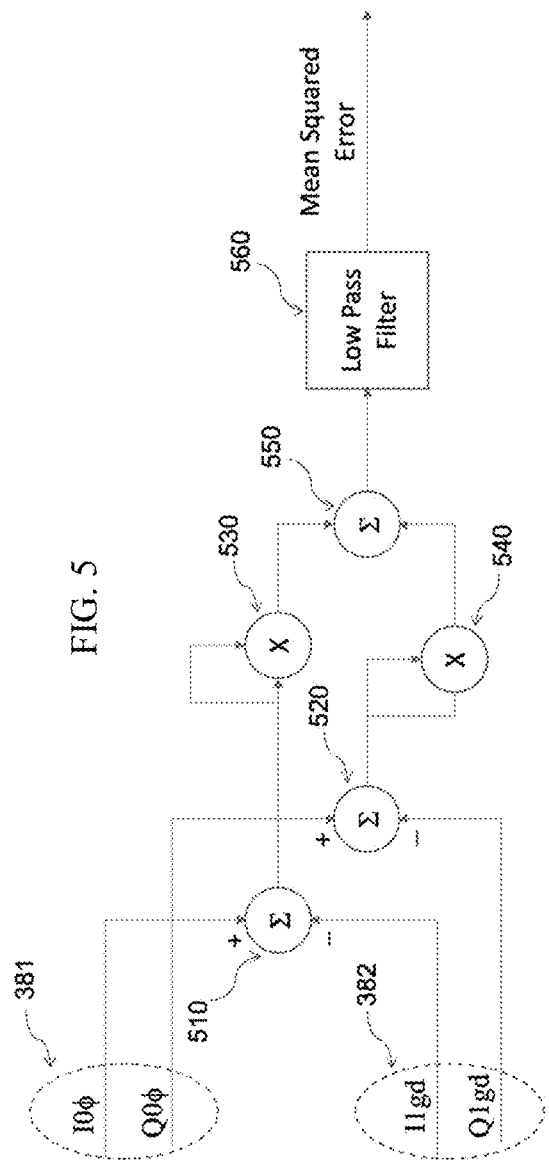
FIG. 5 is a method for measuring mean squared error that results from the digital phase aligner of FIG. 3.

Referring now to FIG. 5, a schematic for measuring mean squared error between outputs channels 381, 382 of the adaptative phase aligner of FIG. 3 is shown. The I/Q pairs 381, 382 are the inputs for measuring mean squared error. Subtractor 510 computes the difference between I0f and I1gd and subtractor 520 computes the difference between Q0f and Q1gd. The two computed differences are squared by multipliers 530 and 540, respectively, and summer 550 computes the sum of the squares. The sum of squares is passed through a low pass filter 550 that computes a running estimate of the Mean Squared Error. This is used to optimize delay and phase angle adjustments.

Figure 6:
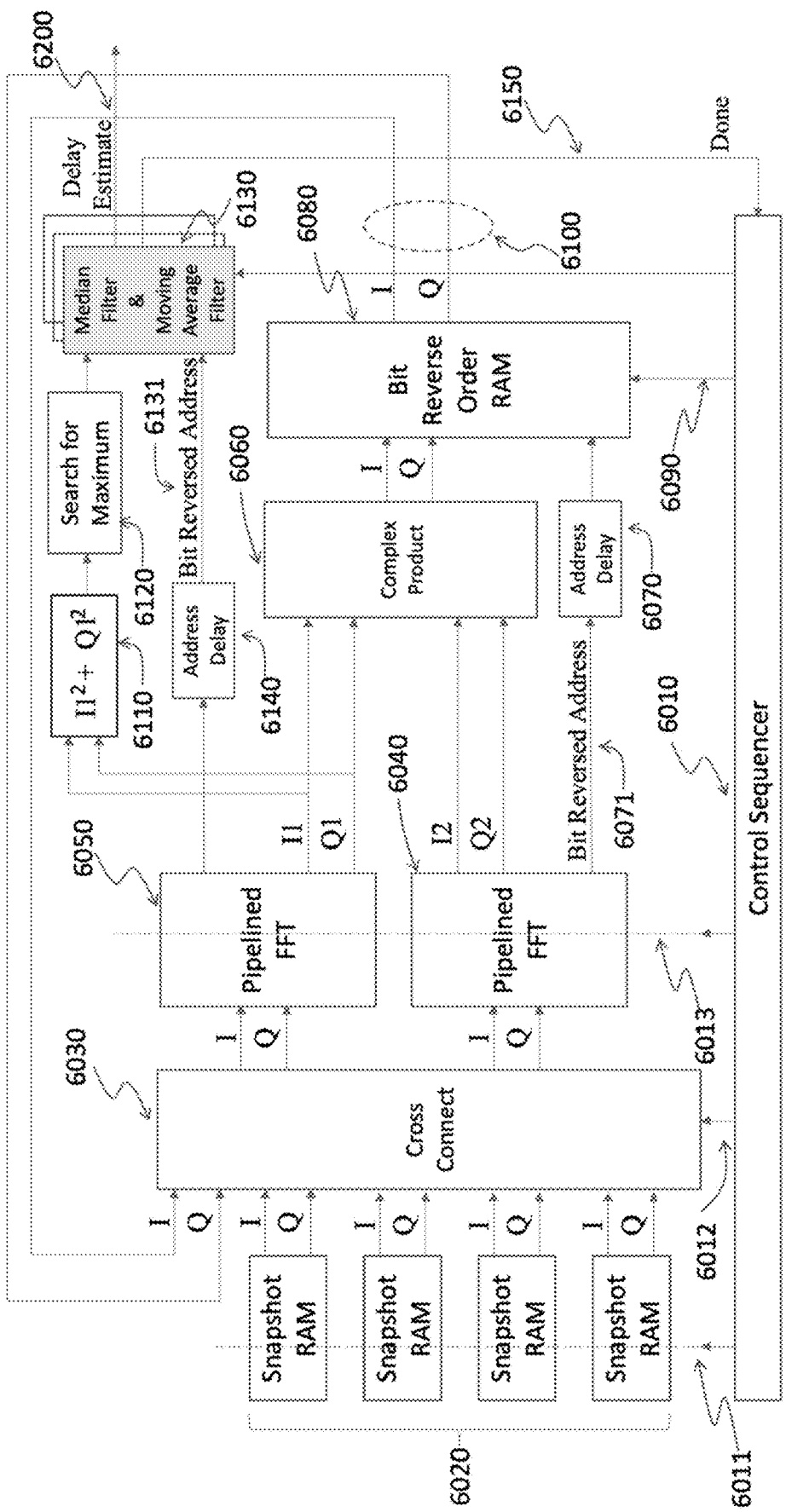
FIG. 6 is a schematic of one embodiment of a delay filter according to the present disclosure.

Referring now to FIG. 6, a schematic of one embodiment for detecting and automatically adapting to changes in received signal delay from separate antennas or antenna elements to perform the delay adjust 250, 251 and sampling phase adjust 270, 271 depicted in FIG. 4 is shown. A delay mismatch in combining signals from multiple antennas results in a degradation of combining gain due to inter-symbol interference (ISI). A control sequencer 6010 receives the indexes for a sequence of antenna pairs from a processor and sequences the order of operations necessary to perform automatic delay estimation of signals of the designated antenna pairs.

To perform this, control sequencer 6010 directs random-access memories (RAM) 6020 to concurrently take time-aligned signal samples from radio frequency (rf) analog-to-digital (ADC) converters (210 in FIG. 4). For this embodiment, four snapshot RAM 6020 are shown, but it will be understood by those with skill in the art that any number of antennas or antenna elements may be synchronously sampled.

After the snapshot RAM 6020 are filled with, for example, 2048 samples each from their antenna sources, a cross connect 6030 selects a pair of antenna element signals out of the list of pairs supplied by a processor, for which a fast Fourier transform (FFT) is to be computed by a pipelined FFT 6040, 6050.

Each pipelined FFT 6040, 6050 sequentially outputs one FFT sample at a time, in bit reverse order. Thus, FFT 6040 includes a bit reversed address index 6071, which indicates the appropriate RAM location for storage of the FFT product, which is computed by the complex product 6060, so that the non-bit-reversed order of the complex product is read out of the bit reverse order RAM 6080 by a sequential non-bit-reversed-order set of addresses 6090 provided by the sequencer 6010 that enables FFT 6050 to, in a subsequent iteration by sequencer 6010, provide a final set of I/Q values, in bit reverse order, to power computer 6110. The output of power computer 6110 feeds a search for maximum 6120, whose output, upon detection of a new maximum, registers the bit reversed address 6131 that is input into the median filter and moving average filter 6130.

There is an instance of filter 6130 for every pair of channels for which delay estimate 6200 is computed. For the embodiment of FIG. 6, three pairs are illustrated. One delay estimate per selected pair is filtered by a separate instance of filter 6130 for each selected pair of antenna signals per snapshot set of samples taken into RAM 6020.

The median filter of the filter 6130, for each channel pair, selects the median value, out of, for example, nine maximum values provided by a subsequent iteration of the search for maximum 6120 for that particular channel pair. The median value, for each channel pair, is further filtered by a moving average filter.

The delay estimate completion per snapshot per pair is indicated by a done signal 6150, which signals the control sequencer 6010 to initiate delay estimation for the next scheduled pair of snapshots. Upon completion of the last snapshot, a new set of snapshots is taken, and the process is repeated continuously.

Figure 7:
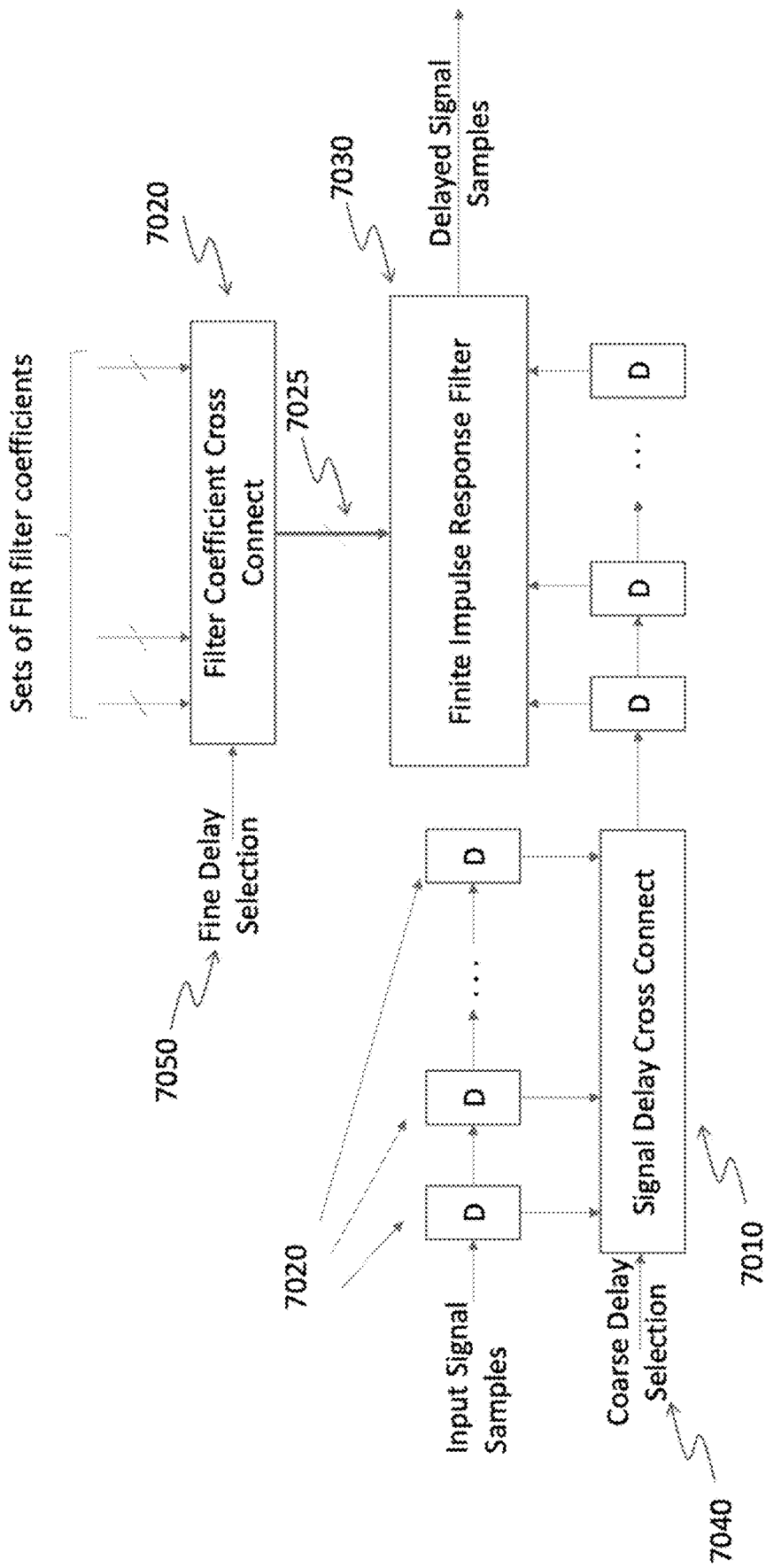
FIG. 7 is a schematic of one embodiment of a finite impulse response filter according to the present disclosure.

Referring now to FIG. 7, one embodiment of a finite impulse response filter (FIR) 7030 configured as a delay filter is shown. The delay filter consists of a coarse delay selection 7010 and a fine delay selection 7020 for adjusting delay for a particular antenna signal path. The set of FIR filter coefficients 7025 filter the delayed signal 7020 offset selected by a signal delay cross connect 7010 as an input into FIR filter 7030. The coarse delay selection 7040 and the fine delay selection 7050 are obtained from the delay estimator of FIG. 6 applied to a specific path by a processor.

Figure 8:
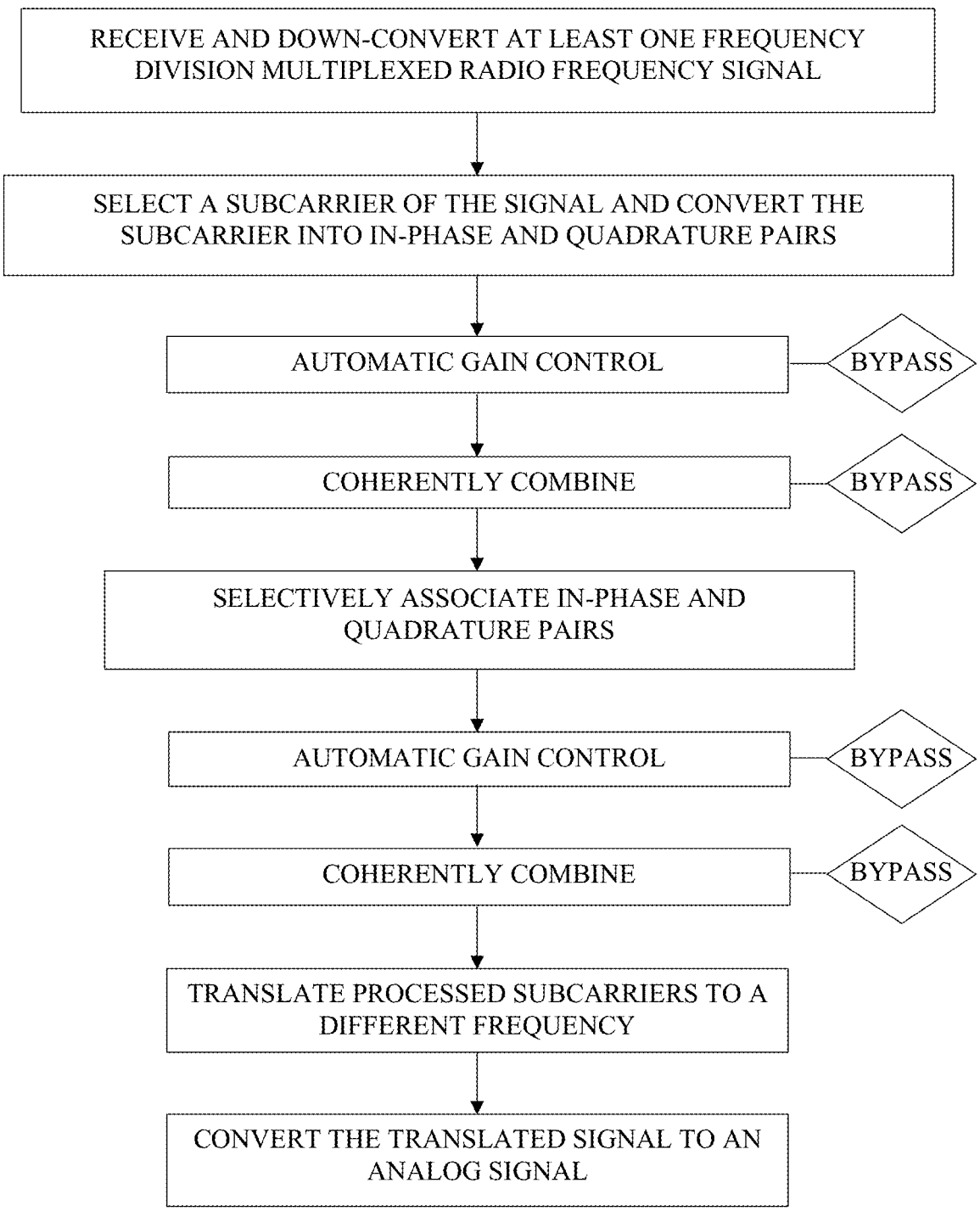
FIG. 8 is a flow chart of one embodiment of a method according to the present disclosure.

FIG. 8 shows steps in a signal processing method that provides the ability to dynamically select a subset of sub-carriers satellites sources and translate the subcarriers into a FDM having a smaller bandwidth than the originally received FDM. The method steps include the processes described above and shown in FIGS. 1 and 2, including, receiving and down-converting at least one frequency division multiplexed radio frequency signal, selecting a subcarrier of the signal and converting the subcarrier into in-phase and quadrature pairs, phase aligning in-phase and quadrature pairs, including providing automatic gain control to each pair and selectively coherently combing the pairs, selectively associating phase aligned in-phase and quadrature pairs, and phase aligning the associated pairs. As noted in FIG. 6, the automatic gain control and coherently combining steps may be bypassed. Once phase aligned, the pairs may be translated back to their original subcarrier frequency or to a different subcarrier frequency to provide a frequency division multiplexed signal that has a more compact bandwidth than the originally received signal. The signals are then converted to an analog signal.

Figure 9:
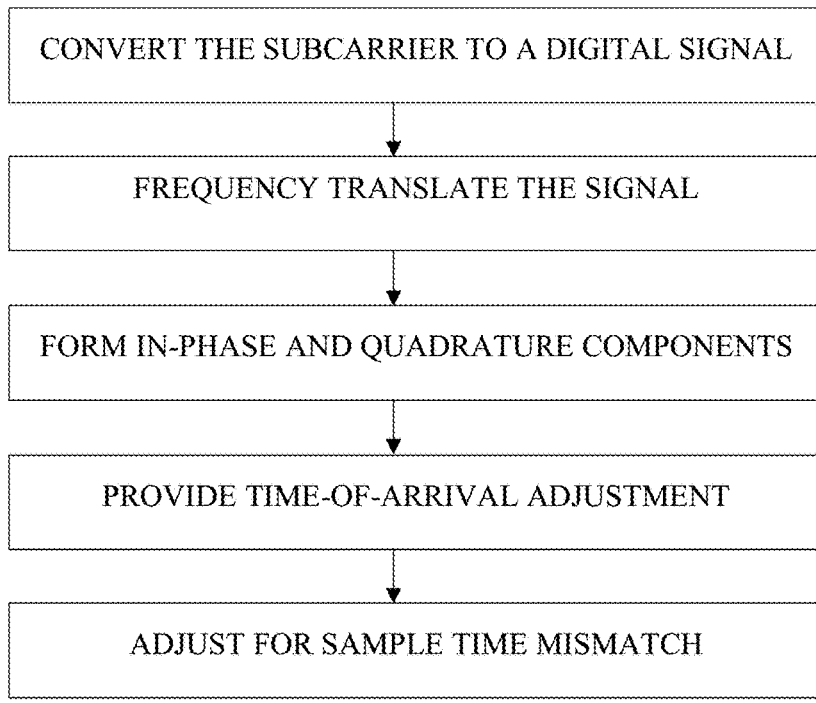
FIG. 9 is a flow chart of a second embodiment of a method according to the present disclosure.

FIG. 9 shows a method for converting a signal into in-phase and quadrature pairs which includes the processes described above and shown in FIG. 4. The steps include, converting the subcarrier to a digital signal, frequency translating the signal, forming in-phase and quadrature components, providing time-of-arrival adjustment, and adjusting for sample time mismatch that results from converting the analog signal to a digital signal.

Figure 10:
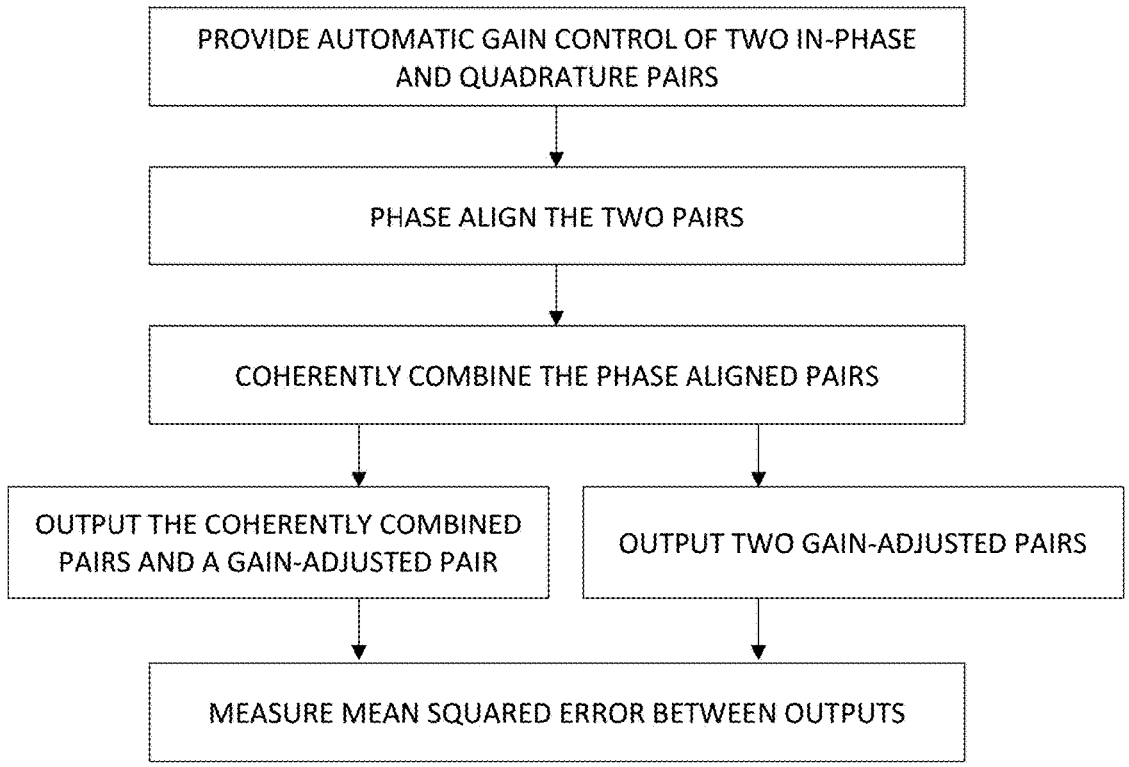
FIG. 10 is a flow chart of a third embodiment of a method according to the present disclosure.

Referring now to FIG. 10, one embodiment of a method for phase aligning I/Q pairs is shown, which includes the processes described above and shown in FIGS. 3 and 5. The steps include, providing automatic gain control of two in-phase and quadrature pairs, phase aligning the two pairs, coherently combining the phase aligned pairs, and outputting the coherently combined pairs and a gain-adjusted pair. Alternative to outputting these pairs, two gain-adjusted pairs that have not been coherently combined are output. The mean squared error between the outputs is then measured to improve phase alignment of in-phase and quadrature pairs.

Although the above description references particular embodiments, it is to be understood that these embodiments are merely illustrative of the principles and applications of the present disclosure. It is therefore to be understood that numerous modifications may be made to the illustrative embodiments and that other arrangements may be devised and employed without departing from the spirit and scope of the present disclosure.

What is claimed is:

1. A signal processing apparatus configured to adaptively phase align and combine radio frequency subcarriers, comprising:
(a) at least two first phase aligners each configured to receive a pair of in-phase and quadrature pairs, said first phase aligners further configured to provide automatic gain control and coherent combing of in-phase and quadrature pairs;
(b) a digital cross-connect configured to receive the in-phase and quadrature pairs from said at least two first phase aligners, said digital cross-connect further configured to associate any two in-phase and quadrature pairs; and
(c) at least two second phase aligners configured to receive the in-phase and quadrature pairs of said digital cross-connect, said second phase aligners further configured to provide automatic gain control and coherent combining of the pairs to produce reduced bandwidth output pairs, wherein the reduced bandwidth output pairs provide data transfer with a low probability of undetected error.

2. A signal processing apparatus as defined in claim 1, and further comprising at least four digital channelizers each configured to receive an output of a radio frequency mixer and convert the output into an in-phase and quadrature pair, said channelizers further configured to output in-phase and quadrature pairs to said at least two first phase aligners.

3. A signal processing apparatus as defined in claim 2, and further comprising at least four radio frequency mixers configured to down-convert radio frequency signals of at least four antenna sources to be received by said at least four digital channelizers.

4. A signal processing apparatus as defined in claim 3, and further comprising at least one digital upconverter configured to translate the reduced bandwidth output pairs to one of their original frequency and an alternate frequency.

5. A signal processing apparatus as defined in claim 4, and further comprising at least one digital to analog converter configured to receive and convert signals from said at least one digital upconverter.

6. A signal processing apparatus as defined in claim 3, wherein said at least four radio frequency mixers are configured to convert a frequency division multiplexed signal to an intermediate frequency band.

7. A signal processing apparatus as defined in claim 2, wherein said at least four digital channelizers are configured to receive and convert subcarriers of a frequency division multiplexed signal.

8. A signal processing apparatus as defined in claim 1, wherein each said first and second phase aligners are configured to selectively provide or bypass at least one of automatic gain control and coherent combining.

9. A signal processing apparatus as defined in claim 1, wherein said first and second phase aligners include:
   (a) a pair of automatic gain controls each including an enabling component, a threshold detector and a dropout detector, each said automatic gain control configured to receive an in-phase and quadrature pair and output a gain-adjusted pair;
   (b) a phase detector, a low pass filter, and a rotator, configured to phase align in-phase and quadrature pairs received by said phase aligner;
   (c) adders configured to coherently combine the phase aligned in-phase and quadrature pairs; and
   (d) a multiplexer configured to output one of the coherently combined pairs and a gain-adjusted delayed pair.

10. A signal processing apparatus as defined in claim 9, wherein said phase aligners further include a mean squared error module configured to measure the mean squared error between phase aligner outputs.

11. A signal processing apparatus as defined in claim 2, wherein each said at least four digital channelizers includes:
   (a) an analog to digital converter configured to digitize a signal;
   (b) a numerically controlled oscillator and multipliers configured to frequency translate signals from said analog to digital converter;
   (c) a pair of lowpass filters configured to receive a signal from said numerically controlled oscillator and output one of in-phase and quadrature component;
   (d) a pair of delay adjusters each configured to receive one of in-phase and quadrature components from one said pair of lowpass filters and further configured to provide time-of-arrival adjustment; and
   (e) a pair of interpolators configured to adjust a time mismatch resulting from said analog to digital converter.

12. At least one non-transitory computer readable storage media having executable instructions stored thereon for adaptively phase aligning and combining a frequency multiplexed subcarrier that when executed by a computer processor perform the steps of:
   (a) receiving and down-converting at least one frequency division multiplexed radio frequency signal from an antenna source, wherein said antenna source includes one of an array of antennas, antenna elements in a phased array antenna structure, and phase aligned subarrays of a phased array antenna structure;
   (b) selecting a subcarrier of the signal and converting the subcarrier into in-phase and quadrature pairs, wherein a subcarrier is selected and converted for each received and down-converted signal;
   (c) phase aligning in-phase and quadrature pairs including providing automatic gain control to each pair and selectively coherently combing the pairs, wherein coherent combining may be bypassed;
   (d) selectively associating phase aligned in-phase and quadrature pairs, wherein any phase aligned pair may be associated with another phase aligned pair; and
   (e) phase aligning the associated pairs including selectively providing automatic gain control and selectively coherently combining the associated pairs, wherein providing automatic gain control and coherently combining the associated pairs may be bypassed.

13. At least one non-transitory computer readable storage media as defined in claim 12 that further performs the steps of:
   (f) translating processed subcarriers to a different frequency to provide a frequency division multiplexed signal having a more compact bandwidth than the originally received signal; and
   (g) converting the translated signal to an analog signal.

14. At least one non-transitory computer readable storage media as defined in claim 12, wherein said converting the subcarrier includes the steps of:
   i. converting the subcarrier to a digital signal;
   ii. frequency translating the signal via a numerically controlled oscillator and multipliers;
   iii. forming in-phase and quadrature components via a low pass filter;
   iv. providing time-of-arrival adjustment; and
   v. adjusting for sample time mismatch that results from converting the analog signal to a digital signal.

15. At least one non-transitory computer readable storage media as defined in claim 12, wherein said phase aligning steps includes the steps of:
   i. providing automatic gain control of two in-phase and quadrature pairs;
   ii. phase aligning the two pairs;
   iii. coherently combining the phase aligned pairs; and
   iv. outputting one of:
      (1) the coherently combined pairs and a gain-adjusted non-coherently combined pair; and
      (2) two gain-adjusted pairs that have not been coherently combined.

16. At least one non-transitory computer readable storage media as defined in claim 15, wherein said phase aligning steps further include the step of measuring mean squared error between outputs to improve phase alignment of in-phase and quadrature pairs.

* * * * *